Feb. 24, 1931.     E. J. HOYOS     1,794,113
PORTABLE PLATFORM
Filed Feb. 12, 1927
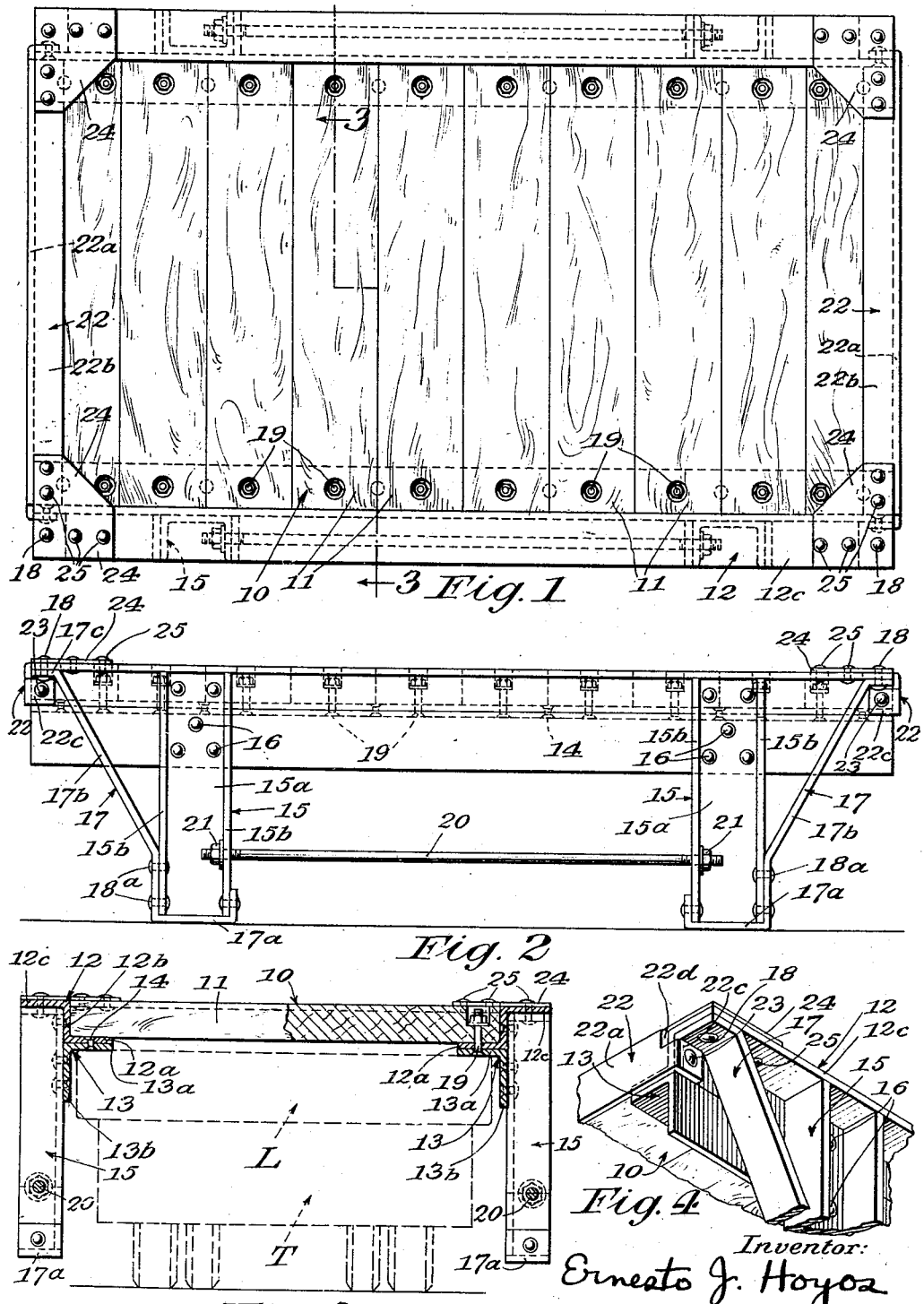

Patented Feb. 24, 1931

1,794,113

UNITED STATES PATENT OFFICE

ERNESTO J. HOYOS, OF WEST ROXBURY, MASSACHUSETTS, ASSIGNOR TO ROBERT T. ROMINE, OF MOUNT CLEMENS, MICHIGAN

PORTABLE PLATFORM

Application filed February 12, 1927. Serial No. 167,672.

This invention relates to portable platforms and especially to that class of platforms adapted to be used with lift trucks wherein the truck is provided with a load elevating platform capable of being introduced beneath the floor of the platform to elevate the platform and its load and transport it from place to place.

An object of the invention is to provide an improved portable platform having a load supporting floor which is supported by legs positioned beyond opposite sides of the floor that are interconnected by combined reinforcing and platform floor supporting and protecting truss members, which members likewise serve as guide means for the lift platform of a truck when moving into position beneath the load supporting floor of the portable platform. My platform is of relatively simplified construction enabling it to be manufactured at a relatively low cost, while at the same time being strong and durable and capable of sustaining with safety extremely heavy loads, such as loads of five, ten or more tons.

Further objects of the invention will appear in the following description and appended claims, reference being had to the accompanying drawings forming a part of this specification wherein like reference characters designate corresponding parts in the several views.

In the drawings:

Fig. 1 is a top plan view illustrating a portable platform embodying my invention.

Fig. 2 is a side elevation of the platform of Fig. 1.

Fig. 3 is a section taken along the line 3—3 of Fig. 1.

Fig. 4 is a detail fragmentary perspective view of one of the corners of my improved platform looking at the under side thereof.

Before explaining in detail the present invention, and the method or mode of operation embodied therein, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention beyond the terms of the several claims hereto appended or the requirements of the prior art.

Portable platforms which are used under present day conditions in connection with power driven electric lift trucks are required to sustain wide variations in loads, ranging anywhere from several tons to twelve and even fifteen tons in weight. In addition the loads are not always centred on the platforms and the drivers of the electric trucks seldom use care in propelling the trucks beneath the platforms, frequently striking the legs and subjecting them to severe blows. Furthermore it frequently happens that the platforms with their loads are placed on uneven ground so that the floor of the platform will not be level. In such cases when the truck platform is introduced beneath the floor board and elevated, one end edge or portion of the floor will frequently receive at first the entire upward thrust, subjecting it to severe strain which heretofore resulted frequently in breaking off the floor boards at the end of the platform.

It is therefore important in providing a commercially satisfactory platform not only to reduce to a minimum the cost of manufacture but also the weight of the platform while constructing the platform in such a way as to withstand the various conditions of use and loads of any weight within a wide range.

It is also important that the load be distributed to the greatest possible extent from the floor boards through the legs, that the upward thrust of the truck platform be sustained and distributed uniformly from end to end of the platform, and that the legs be constructed to sustain loads whether centred or not and whether the platform is supported on level or uneven ground. In addition it is important that the legs be constructed to withstand impacts in any direction from the trucks or as the result of collisions while the platforms are being transported from place to place.

The portable platform in the present instance comprises a load supporting floor 10 which preferably is formed of a series of cross bars 11.

Referring to Figs. 1 to 3, it will be seen that a supporting truss 12 extends lengthwise beneath the platform floor at each longitudinal side thereof, the truss, in this instance, comprising, preferably, a Z-bar having a lower inwardly extending flange 12a, a vertically extending web 12b and an upper outwardly extending flange 12c. Also extending lengthwise beneath the platform floor and at each of its longitudinal sides is an angle bar 13 having a horizontal flange 13a positioned back to back with the flange 12a of the Z-bar 12 and secured thereto preferably, by means of countersunk rivets or the like 14 to form an integral structure. The angle bar 13 is also provided with a vertically extending flange 13b which is preferably, although not necessarily, in the same vertical plane as the flange 12b of the Z-bar 12. It will be seen that by riveting the Z-bar and angle bars together, a pair of compound truss members are provided, which extend at opposite sides of the load supporting floor 10 and in parallel relation, substantially the entire length of the platform.

In order to support the platform at opposite sides, leg supports 15 are provided each comprising a vertical channel having a central web 15a which is secured by means of rivets or the like 16 to each of the vertical flanges 12b and 13b of the Z-bar 12 and the angle bar 13, respectively, the central web 15a of each channel being positioned back to back with the flanges. Each channel also comprises a pair of vertical flanges 15b which extend outwardly from the central web 15a. In order to reinforce and brace the channels 15, each leg support includes a bar 17 which may be bent so as to provide a horizontal flat bearing surface or foot portion 17a for the bottom of the leg, and an upwardly extending outwardly flared portion 17b having an angularly bent upper end or flange 17c which is secured to the outwardly extending horizontal flange 12c of the Z-bar 12 by means of a rivet or the like 18. Likewise the bar is secured adjacent the lower end of each of the flanges 15b of the vertical channel 15 by means of similar rivets 18a. It will be seen that by bracing the channel 15, by means of the bar 17, a rigid leg support is provided.

Referring particularly to Fig. 3, the horizontal flange 12a of each Z-bar serves to support the boards of the load supporting floor 10, the several boards being secured to the flanges by means of bolts 19. The horizontal inwardly extending flange 13a of each angle bar 13 together with the similarly formed flange 12a of the Z-bar 12 are adapted to receive and distribute throughout the length of the portable platform, the upward thrust of the truck platform L when elevated to lift the portable platform and its load. The vertical flanges 13b of the angle bars 13 provide guide means for the lift platform L of a lift truck T when the truck platform is introduced beneath the portable platform. The vertical flange 12b of each Z-bar being positioned between the ends of the boards forming the floor 10 and the leg supports (see Fig. 3), serves to protect the board ends against damage. Moreover, by providing compound structural members or trusses for the platform, the load supporting floor thereof is capable of supporting loads aggregating, in some instance, fifteen tons, and by positioning the flanges 12a and 13a back to back, a greater protection for the under sides of the boards 11 of the floor 10 is afforded.

To additionally brace the channels 15 of the leg supports, each pair of leg supports is provided with a tie rod 20, threaded at opposite ends and adapted to be inserted in apertures in the flanges 15b of each vertical channel and held in engagement therewith by means of nuts 21. With the use of such tie rods, it is possible to maintain the channels 15 in cooperative relation and against movement relative to the remaining structure of the platform at all times, by simply adjusting the nuts 21.

At opposite ends of the platform an angle bar 22 may be provided each angle bar having a vertically extending flange 22a protecting the longitudinal edge of the end board or plank 11 of the floor 10, and a horizontal flange 22b overlying a portion of said board. The vertical flange 22a has a portion removed therefrom at its opposite ends as shown at 22d to provide projecting portions 22c which are bent inwardly and secured to the vertical flange 12b of the Z-bar 12 at its opposite ends by means of rivets or the like 23.

To additionally brace and strengthen the corners of the portable platform and prevent any relative movement of the longitudinal and transverse reinforcing members thereof, gusset plates 24 are provided, which are secured to the flanges 12c and the flanges 22b of the members 12 and 22, respectively, by means of rivets or the like 25. The rivets 18 previously referred to, also serve to additionally secure the gusset plates in position at their corners.

What I claim is:

1. A portable platform comprising a floor, a truss member extending along each longitudinal side of the floor, each such member comprising a vertical portion abutting against the outer longitudinal edge of the floor and projecting in the same vertical plane below the floor to provide a guide for a truck, a portion extending inwardly beneath the floor to support the same, a horizontal portion extending outwardly from the edge of the floor, said truss portions being joined together, and a leg mounted beneath said outwardly extending horizontal portion and secured to said vertical portion.

2. A portable platform comprising a floor, a truss member extending along each longitudinal side of the floor and each comprising a vertical flange portion abutting against the outer edge of the floor and extending downwardly into position to form a guide for a truck, a horizontal flange portion extending inwardly from said vertical flange portion to support the floor and also to receive the upward thrust of the truck, and a horizontal flange portion extending outwardly from and beyond the edge of the floor; and legs mounted beneath said last named flange portion and secured to the vertical flange portion whereby to provide an outboard support.

3. A portable platform comprising a load supporting floor, leg supports for said platform positioned beyond opposite sides of said floor, and spaced truss members extending longitudinally of the platform having a portion connected with the leg supports, a portion extending beneath the floor for supporting the same, a portion for protecting the side edges of the floor, and guide and thrust receiving portions connected with said floor supporting portion and with the leg supports.

4. A portable platform comprising a floor, a truss member extending along each longitudinal side of the floor and each comprising a vertical flange portion abutting against the outer edge of the floor and extending downwardly into position to form a guide for a truck, a horizontal flange portion extending inwardly from said vertical flange portion to support the floor and also to receive the upward thrust of the truck, and a horizontal flange portion extending outwardly from and beyond the edge of the floor in a horizontal plane above the plane of the inwardly extending horizontal flange portion and above the plane of the bottom of the floor.

In testimony whereof I affix my signature.

ERNESTO J. HOYOS.